United States Patent [19]
Hojo et al.

[11] Patent Number: 5,109,693
[45] Date of Patent: May 5, 1992

[54] THERMALLY STABILIZED ACCELEROMETER

[75] Inventors: Takeshi Hojo, Kuroiso; Michio Fukano, Ohtawara; Mitsuru Kato, Kuroiso, all of Japan

[73] Assignee: Tokyo Keiki Co., Ltd., Tokyo, Japan

[21] Appl. No.: 525,972

[22] Filed: May 18, 1990

[30] Foreign Application Priority Data

May 29, 1989 [JP] Japan .................................. 1-135524

[51] Int. Cl.⁵ ............................................ G01P 15/13
[52] U.S. Cl. ..................................... 73/497; 73/517 B; 335/217
[58] Field of Search ............... 73/497, 517 B; 335/217

[56] References Cited

U.S. PATENT DOCUMENTS 3,325,757  6/1967  Gang ..................................... 335/217
3,325,758  6/1967  Cook ..................................... 335/217
3,498,138  3/1970  Stewart ............................... 73/517 B Primary Examiner—John E. Chapman
Attorney, Agent, or Firm—Bauer & Schaffer

[57] ABSTRACT

A pair of torquer magnets each comprising a cup-shaped yoke is provided with a disk-like permanent magnet and a pole piece. A through-hole provided through the center of the torquer magnet and a spool member made of a magnetic compensating metal is inserted into and fixed in the through-hole. The spool is shaped to have a central portion intermediate its end of a substantially smaller diameter.

5 Claims, 2 Drawing Sheets

THERMALLY STABILIZED ACCELEROMETER

BACKGROUND OF THE INVENTION

1. Field of the Invention

The present invention relates to an accelerometer and, more particularly, to a thermally stabilized accelerometer.

2. Description of the Prior Art

FIG. 1 is a cross sectional view showing an example of a prior art accelerometer, and FIG. 2 is a plan view thereof partially sectioned.

In the prior art device, a rod-like pendulum 1 is provided to detect acceleration. The pendulum 1 is supported on a hinge 3 having a central flexible or a thin joint portion so as to swing about the joint portion 2 only in a direction indicated by the arrows X—X parallel to the surface of the drawing sheet. One end of the hinge 3 is firmly fixed to the base 5 of pot-shaped frame 4 by a pressure plate 6, screw 6A, or the like. The pendulum 1 has attached to it two cylindrical torquer coils 7 and 7' whose planes are perpendicular to the swing axis of the thin joint portion 2, i.e. axis 0—0. A disk-like permanent magnet 8 and a column-shaped pole piece 9 are inserted in and attached to the frame 4 by adhesive material, for example, and spaced from the wall of the frame 4 to allow the torquer coil 7 to be inserted therebetween without contact. The first frame 4 is made of electromagnetic soft-iron so that it forms an electro magnetic circuit with the pole piece 9 and the permanent magnet 8. Thus constructed, the frame 4 serves as a yoke (return path) for the magnet flux and the entire unit constitutes a first torquer defined by the numeral 30. This first torquer is equipped with apparatus for detecting the displacement of the pendulum 1 comprising two light receiving elements 10, 10' and a light emitting element 11 mounted on the frame 4.

The illustrated accelerometer has a second base or a frame 12 made of electromagnetic soft-iron, as is the first frame 4. A permanent magnet 13 and a column-shaped pole piece 14 are attached within the pot of the frame 12 to allow insertion the torquer coil 7' without contact therewith. The second frame 12 also serves as a yoke, and the assembly constitutes a second torquer magnet generally defined by the numeral 31. An engaging portion 16 is formed on the second frame 12 for insertion inserted into an opposing engaging portion 15 formed on the first frame 4 so that the frames can be made into a unitary body.

The first frame 4 and the second frame 12 are provided with adjustable stoppers (not shown) which limit the range of movement of the pendulum 1. When the stoppers are respectively rotated and moved by a screw, the range can be freely adjustable.

The above-mentioned components function as an accelerometer. They may be fixed in a housing formed by the frame 4 and a casing 23 by a plurality of screws, and kept in airtight condition by a cover 25 over the opening 24.

External terminals 22 extend through the housing 23 for connection to lead lines (not shown) or the like by which an electrical signal from the light receiving elements 10, 10' can be supplied. The light receiving elements 10, 10' constitute the displacement detector and a feed-back current source to the torquer coils 7, 7' After wiring the electronic system within the terminal case 23, the opening 24 is closed by the lid 25, and the interior of the case 23 is placed under vacuum or filled with inert gas (for example, helium) and kept in airtight condition to avoid deterioration of the parts and maintain the assembly stable for a long period of time.

When acceleration is applied to the above described accelerometer in the X—X direction, the pendulum 1 will be slightly displaced, with the thin joint portion 2 of the hinge 3 as the center of rotation. Thus, displacement of the pendulum 1 produces a change in the incident light received by light receiving elements 10 and 10', causing an electrical output signal corresponding to the displacement of the pendulum 1 to be created. This electrical signal is fed to the torquer coils 7, 7', changing the flux pattern and causing the pendulum 1 to be restored to its initial such that the output electrical signals from the light receiving elements 10 and 10' are made zero. This electrical current, being a restoring current, is in proportion to the acceleration so that it also functions as an input current by which acceleration can be measured.

By the way, in FIG. 2, numeral 19-3 indicates an attaching aperture for attaching the above-mentioned acceleration to the body whose acceleration is to be measured.

This prior conventional accelerometer cannot, however, provide high accuracy measurement because the magnetic motive force of the permanent magnet 8 varies in response to the change of external temperature. As a result, the ratio of input acceleration to output signal, in other words the scale factor, is influenced by temperature change.

OBJECT AND SUMMARY OF THE INVENTION

An object of the present invention is to provide a thermally stabilized accelerometer that overcomes the above-mentioned problems encountered in the prior art accelerometer.

The above and the other objects, features, and advantages of the present invention will become apparent in the following detailed description of a preferred embodiment when read in conjunction with the accompanying drawings.

DETAILED DESCRIPTION OF A PREFERRED EMBODIMENT

As seen in

Figure 1:
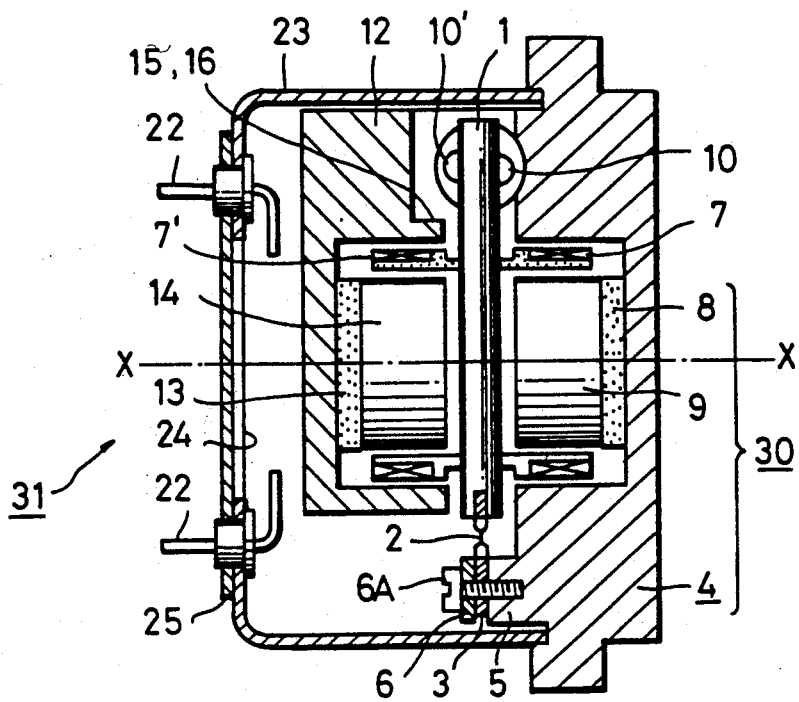
FIG. 1 is a cross sectional view of a conventional accelerometer.
Figure 2:
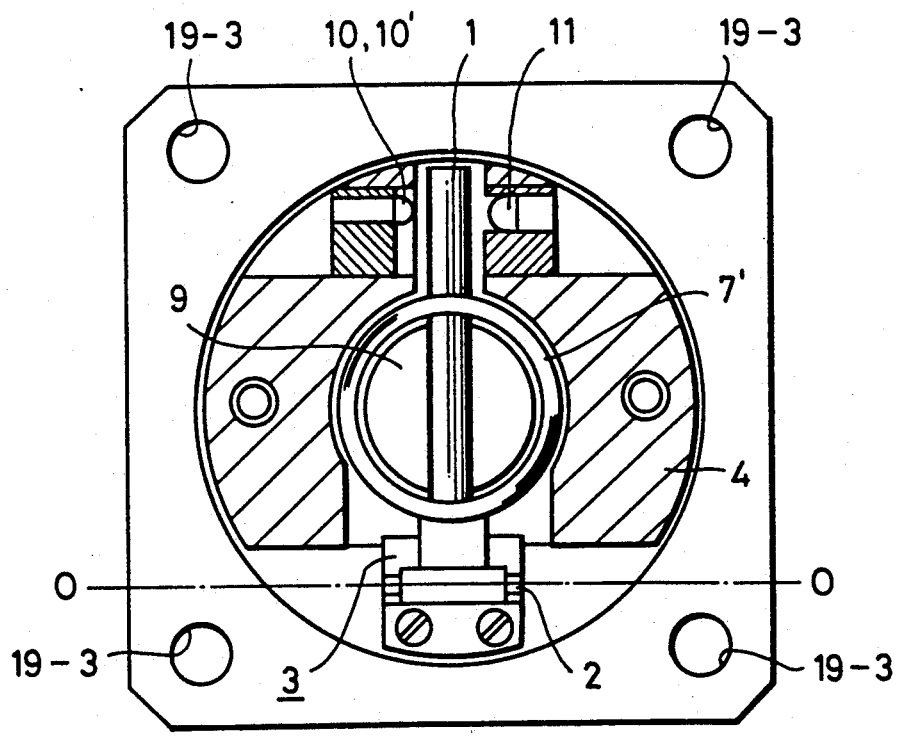
FIG. 2 is a plan view partially sectioned of the accelerometer shown in FIG. 1.
Figure 3:
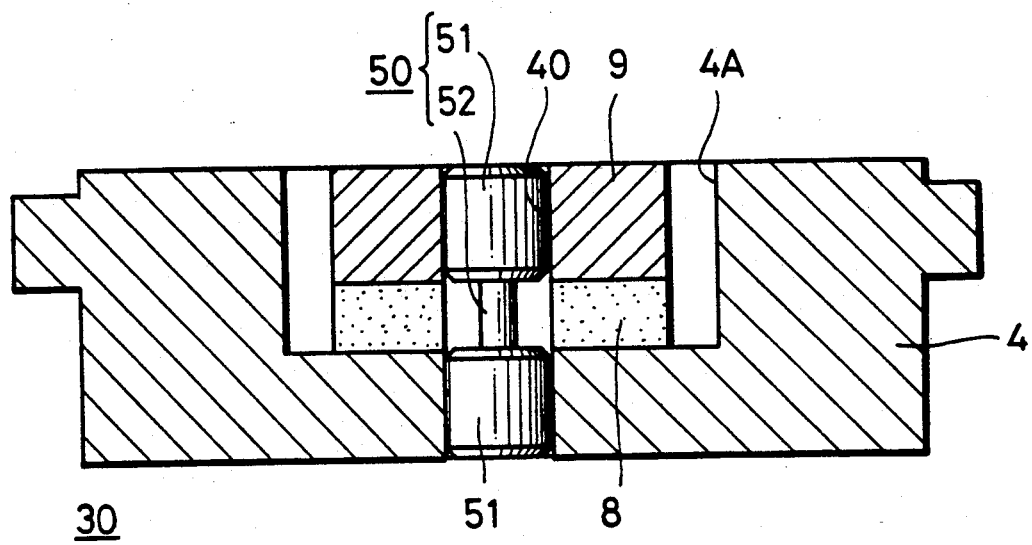
FIG. 3 is a cross sectional view of a torquer magnet embodying the present invention.

FIG. 3, the accelerometer comprises torquer magnet 30, 31, having a pot-like yoke 4, 12, a disk-like permanent magnet 8, 13 attached in the pot-like yoke, and pole pieces 9, 14. A through-hole 40 is provided at the center of the torquer magnet, and a spool 50 made of magnetic compensating metal is inserted and fixed in the through-hole to provide compensation in the scale factor so as to be an affected by temperature change. The spool member 50 compensates for the influence in the scale factor caused by the temperature change. As the structure of the second torquer magnet 31 may be the same as that of the first torquer magnet 30, illustration and explanation of such second torquer magnet 31 is omitted. Further, the remaining structure of the accelerometer is the same as that shown in FIG. 1 and FIG. 2 so that its illustration and relevant explanation is also omitted.

In FIG. 3, a through-hole or aperture 40 is provided through the center of the torquer magnet 30, that is through frame 4, the permanent magnet 8, and pole piece 9. The frame 4 (yoke) has a pot-like shape provided with a depressed portion 4A into which the magnet and pole piece sit. A spool 50 made of magnetic compensating alloy whose magnetic resistance increases as its temperature increases is set within the through hole 40. The spool 50 comprises, at its center portion, a column-shaped magnetic flux compensating portion 52 whose diameter is relatively small and column-shaped magnetic flux leading portions 51, 51 at either end and whose diameter is relatively large. The spool 50 is inserted into the aperture 40 and fixed to the aperture 40 at the magnetic flux larger diameter leading portions. Further, both the disk-like permanent magnet 8 and the column-shaped pole piece 9 are fixed coaxially to the pot-like yoke 4 in its depressed portion 4A.

Figure 4:
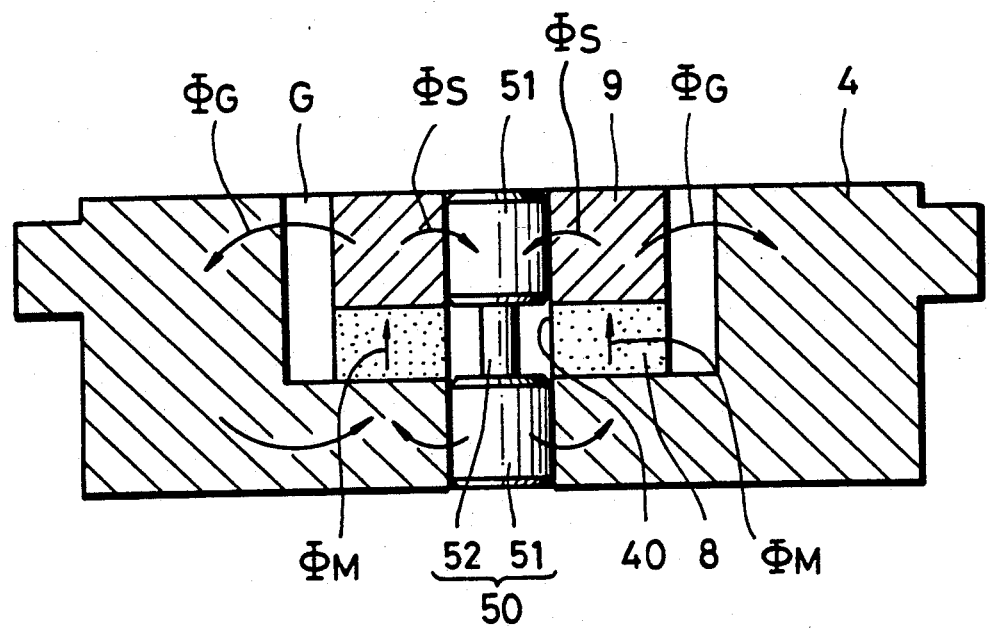
FIG. 4 is a view similar to FIG. 3, illustrating the flux pattern thereof.

FIG. 4 is a drawing used for explaining the principle of the invention.

Now assuming that $\Phi_M$ indicates a magnetic flux generated from the magnet or the permanent magnet 8, $B_M$ indicates its magnetic flux density, $A_M$ indicates a cross sectional area of a magnetic path of the magnetic flux $\Phi_M$, $\Phi_G$ indicates a magnetic flux passing through a gap G between the pole piece 9 and the pot-like yoke 4, $B_G$ indicates its magnetic flux density, $A_G$ indicates a cross sectional area of a magnetic path of the magnetic flux $\Phi_G$, $\Phi_S$ indicates a magnetic flux from the pole piece 9 through the spool member 50 to the magnetic flux compensating portion 52, $B_S$ indicates its magnetic flux density, and $A_S$ indicates a cross sectional area of the magnetic path of the magnetic flux $\Phi_S$. In order to simplify the explanation, there presupposes no magnetic flux leakage. As shown in FIG. 4, the following equations are obtained.

$$\Phi_M = \Phi_G + \Phi_S \quad (1)$$

$$A_M B_M = A_G B_G A_S B_S \quad (2)$$

If a condition should be held that the magnetic flux density $B_G$ of the magnetic flux $\Phi_G$ passing the gap G is constant ($\partial B_G/T = 0$) regardless of temperature T and the cross sectional area of each magnetic path is constant regardless of temperature change, the following equation will be led.

$$A_M \frac{\partial B_M}{\partial T} = A_S \frac{\partial B_S}{\partial T} \quad (3)$$

In other words, assuming that $\alpha_M$ is a temperature coefficient of magnetic motive force of the permanent magnet 8 and $\alpha_S$ is a temperature coefficient of magnetic flux density of the magnetic compensating alloy, the following equations will be obtained.

$$\alpha_M = \frac{1}{B_{M0}} \frac{\partial B_M}{\partial T} \quad (4)$$

$$\alpha_S = \frac{1}{B_{S0}} \frac{\partial B_S}{\partial T} \quad (5)$$

-continued $$A_S = A_M \cdot \frac{\alpha_M B_{M0}}{\alpha_S B_{S0}} \quad (6)$$

In these equations, $B_{MO}$ and $B_{SO}$ indicate magnetic flux densities of the permanent magnet 8 and the magnetic compensating alloy in operation. That is, the cross section area $A_S$ of the magnetic flux compensation portion 52 of the spool member 50 through which the magnetic flux $\Phi_S$ passes is determined so as to satisfy the above equation (6), whereby change of the magnetic flux density $B_G$ passing the gap G or the scale factor of the accelerometer caused by temperature change can be made zero. By the way it is necessary that the diameter of the magnetic flux leading portion 51 of the spool member 50 is selected large enough as compared with the diameter of its magnetic flux compensating portions 52. The reason is that the variation of the magnetic flux density $B_S$ at the magnetic flux compensation portion 52 must be reduced as a magnetic resistance change caused by variation of the gap between the spool member 50 and the aperture 40.

As described above, the present invention offers the following effects.

A simple structure having simple parts is provided as a result of placing the aperture at the center of the torquer magnet and inserting a spool made of magnetic compensating alloy into the aperture. As a result, a high property accelerometer without change of scale factor caused by temperature variations is obtained.

The diameter of the magnetic flux leading portion of the spool may be determined to be small enough compared with the diameter of the magnetic flux compensating portion of the spool member, thereby a temperature compensation apparatus is obtained that is least influenced by variation of the gap between the aperture 40 and the magnetic flux leading portion 51.

Having described a preferred embodiment of the invention with reference to the accompanying drawings, it is to be understood that the invention is not limited to that precise embodiment and that various changes and modifications could be effected by one skilled in the art without departing from the spirit or scope of the novel concept of the invention a defined in the appended claims.

We claim as our invention:

1. A thermally stabilized accelerometer having an acceleration sensing element and at least one torquer magnet to rebalance said sensing element, said torquer magnet comprising a pot-like yoke, a disk-like permanent magnet and a pole piece, said permanent magnet and said pole piece being attached to said yoke at the pot-like center; a central through-hole provided through said torquer magnet; and an elongated spool member of magnetic compensating alloy fixedly inserted within said through-hole, said spool member having a flux leading portion at each end thereof and a flux compensating portion between said flux leading portions, said flux compensating portion having a diameter less than that of each of said flux leading portions; whereby the scale factor of the accelerometer is not influenced by temperature change at all.

2. An accelerometer according to claim 1, wherein the outer diameter of the magnetic flux leading portions of said spool member is substantially the same as the inner diameter of said through-hole.

3. An accelerometer as set forth in claim 1, wherein said through-hole extends through said magnet, said pole and said yoke, and wherein said spool is dimensioned so that one of said flux leading portions thereof is located within said pole piece, and the other said flux leading portion is located within said yoke, and said flux compensating portion is located within said permanent magnet.

4. A thermally stabilized accelerometer comprising an opposed pair of torquer magnets, each of said torquer magnets haing a cup-shaped yoke, a permanent magnet secured within the cup of said yoke, a pole piece mounted on said permanent magnet spaced from the walls of the cup of said yoke, an elongated spool of magnetic compensating material located within a through-hole extending centrally within said pole piece, said permanent magnet and said yoke, and a pendulum displaceably mounted between said opposed torquer magnets facing the pole pieces, said pendulum having mounted thereon a cylindrical coil extending within the space between said yoke and said pole piece of each torquer magnet, means for detecting the movement of said pendulum and for providing an output signal indicative thereof to said cylindrical coil, said spool having enlarged portions at each end and an intermediate portion of substantially smaller diameter therebetween, whereby the temperature sensitivity of said accelerometer is reduced.

5. The accelerometer according to claim 2, wherein one end of said spool is set within said yoke, the other end of said spool is set within said pole piece and the intermediate portion of smaller diameter lies within and is spaced radially from said permanent magnet.

* * * * *